United States Patent [19]
Botros

[11] 3,785,766
[45] Jan. 15, 1974

[54] PROCESS FOR DYEING POLYESTER TEXTILES WITH ANTHRAQUINONE DYESTUFFS BY THERMOFIXATION

[75] Inventor: Raouf Botros, Lock Haven, Pa.

[73] Assignee: American Aniline Products, Inc., Paterson, N.J.

[22] Filed: Jan. 31, 1972

[21] Appl. No.: 222,361

[52] U.S. Cl. .................. 8/21 C, 8/39, 260/378, 260/380
[51] Int. Cl. .................. D06p 1/20, D06p 3/82
[58] Field of Search .................. 8/39 R, 39 C; 260/378, 380

[56] References Cited
UNITED STATES PATENTS

| | | | |
|---|---|---|---|
| 3,390,947 | 7/1968 | Shown et al. | 8/39 C |
| 3,444,214 | 5/1969 | Buecheler | 8/39 C X |
| 3,657,284 | 4/1972 | Booth et al. | 260/378 |

OTHER PUBLICATIONS
Colour Index, 3rd Ed., Vol. 4, 1971, page 4551, C.I. 62545.

Primary Examiner—Leon D. Rosdol
Assistant Examiner—T. J. Herbert, Jr.
Attorney—Armstrong & Wegner

[57] ABSTRACT

Anthraquinone dyes for dyeing polyester fabric are made by the reaction of an arylamine, such as aniline, with a dichlorochrysazin in which one of the chlorine atoms is in a non-peri position, the reaction being conducted in the presence of boric acid. This class of anthraquinone dyes, when appropriately dispersed, produces blue-green dyeings on aromatic polyester fabrics with excellent substantivity, outstanding sublimation fastness, and good fastness to light. The dyes are applied to polyesters, such as polyethylene terephthalate, preferably by thermofixation methods.

10 Claims, No Drawings

PROCESS FOR DYEING POLYESTER TEXTILES WITH ANTHRAQUINONE DYESTUFFS BY THERMOFIXATION

BACKGROUND OF THE INVENTION

Among the polyester fibers, those based on polyethylene terephthalate continue to be the most important, although fibers based on 1,4-dimethylcyclohexane terephthalate have become commercially available. Developments in both homo-and copolyesters have continued and many modified versions of polyethylene terephthalate have recently appeared on the market. With the advent of new fibers, the search has continued for dyes which build up on the various types of polyester fabric proportionate to the amount of dye applied, and which are characterized by good light and excellent sublimation properties.

In polyester fibers, the diffusion of the dye into the fiber is effectively controlled by the mobility of the chain molecules in the disordered regions. However, the molecular shape and the size of the dye, the presence of polar groups and general steric considerations are also important in relation to the rate of diffusion.

Disperse dyes are ordinarily applied to aromatic polyester fibers by carrier dyeing, pressure dyeing and thermo-fixation methods. The fundamental thermofixation method, described in U.S. Pat. 2,663,612, is adaptable for dyeing of both polyester and mixed polyester-cotton blends and permits rapid and economical production of a high volume of dyed fabric. The use of thermofixation methods requires dyes with a high diffusion rate and good solubility in polyester fibers in order to fully utilize the dye and to obtain level and reproducible dyeings. Unfortunately, dyes with the high diffusion rate required for thermofixation are often easily extracted into the finishing agents during conventional after-treatments such as a durable press finish curing operation. Because of this problem, useful dyes should have a high diffusion rate in polyester fibers at the thermofixation temperature (400°–430°F), a low diffusion rate at the durable press curing temperature (300°–350°F) and high solubility in polyester fibers.

I have discovered certain 1,4-bis(arylamino)haloanthraquinone dyes which provide dyeings of a deep blue-green hue when applied to polyester textile material by thermo-fixation methods. Dyed fabric provided by the invention can be after-treated as required with excellent results.

SUMMARY OF THE INVENTION

In accordance with the invention, there is provided a dye formula:

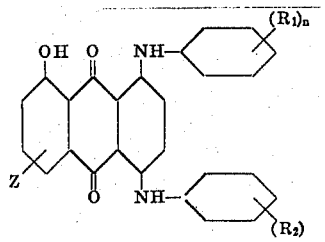

wherein Z is a non-peri chlorine or bromine, $R_1$ and $R_2$ are hydrogen, chlorine, bromine, lower alkyl or lower alkoxy and n has a value of 1–3.

The dyes of the invention are made by admixing 4,X-Di-chlorochrysazin, an aryl amine of the formula

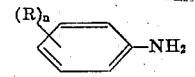

in which R and n are defined above and a catalytic amount of boric acid, lower alkyl borates or boron oxides. The mixture is allowed to react at an elevated temperature of 125°C up to the reflux temperature of the mixture until the reaction is substantially complete and the product is recovered therefrom by filtration.

The dyes of the invention are preferably applied to polyester textile material, including mixed blends of polyester-cotton, by a thermofixation process involving padding the polyester textile material with a dilute dispersion of the product dye, drying the padded cloth to remove water, and heat-curing the dried material at a temperature of 350°–430°F for a period of about 2 minutes or less.

DETAILED DESCRIPTION

The starting material for use in the invention is a dihalochrysazin made by treating chrysazin with sulfuryl chloride or bromine in nitrobenzene at reflux for several hours. The resulting product is a 4,x-dihalochrysazin, in which X may be the 6-position of the anthraquinone nucleus. The literature reports the dichlorination of chrysazin (1,8-dihydroxyanthraquinone) by treating it with chlorine in aqueous acetic acid at 100°C; DRP 127,669 Frdl. 6 328. An alternate process is described in DRP 172,300, Frdl. 8 274, in which chrysazin is treated in aqueous sulfuric acid at 125° with potassium chlorate and sodium chloride. The products of both processes are said to be 4,5-dichlorochrysazin. However, according to the experimental results using my recommended halogenation procedure, one of the halogens is in a non-peri position. Thus, the dihalochrysazine produced provides a unique product when treated according to the method of the invention.

The 4,X-dihalochrysazin is allowed to react with an aryl amine of the formula:

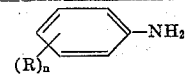

in which R and n are as defined above. Suitable aryl amines for use in the reaction include aniline, p-toluidine, m-toluidine, p-anisidine, p-chloroaniline, p-phenetidine and m-chloroaniline. The various xylidines and mesidine are also useful in the reaction.

The reaction is conducted in the presence of a catalytic amount of boric acid, a lower alkyl borate, such as triethyl or trimethyl borate or a boric oxide, generally between 0.5–5 percent by weight, based on the weight of the reaction mixture. The presence of the boric acid or a borate ester or oxide is essential in order to provide the novel products of the invention. If the same reactants are mixed together in the presence of an alkaline acid-binding agent and a copper salt, both halogens are replaced by an aryl amino group and the resulting product is, 1,8-dihydroxy-4,X-bis-(arylamino)anthra-quinone. Such products are distinctly blue in hue and virtually no residual chlorine can be detected by standard analytical methods.

The reaction of the present invention is conducted at an elevated temperature between 125°C and the reflux temperature of the reaction mixture. It is convenient to use an excess of the amine reactant as a reaction medium, although it is possible to use substantially stoichimetric amounts of reactants in the presence of an inert solvent. After completion of the reaction, which generally takes between 10–24 hours, the product is separated and recovered by conventional methods.

A particularly convenient way to recover the product in a purified form is to dilute the reaction mixture with methanol or denatured alcohol in an amount of 100 to 300 percent based on the volume of the reaction mixture. In this method of product recovery, the reaction mixture is first cooled, the alcohol is added and the mixture is reheated to reflux. It is then allowed to cool gradually to room temperature, filtered, and the product collected on the filter is washed again with alcohol and thereafter, oven-dried. When suitable, the alcohol solution of the reaction mixture may be filtered hot. Further purification of the product may be achieved by digestion of the cake in 5 parts by weight of dimethyl formamide at room temperature, filtering and washing again with hot water.

The presence of the residual non-peri chlorine provides a reactive position which can be utilized in the preparation of other new and useful products. For example, the products of the invention can be further reacted with a compound of the formula RXH in which R is aryl, e.g., phenyl, lower alkyl phenyl, lower alkoxy phenyl or halophenyl; lower alkyl or a hydrocarbon residue of a heterocycle; and X is oxygen or sulfur.

The reaction can be summarized as follows:

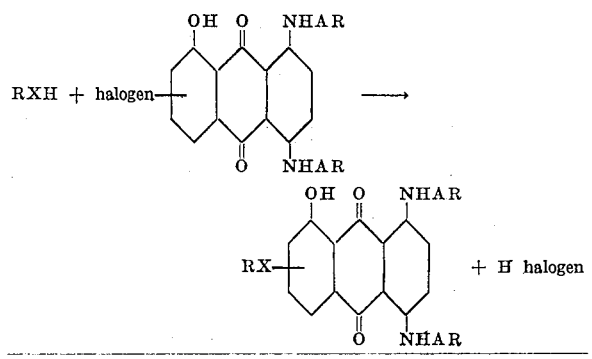

Specific useful compounds are 1-propanethiol; 1-pentanethiol; α-toluenethiol; 2-mercaptoethanol; 1,2-ethanedithiol; benzenethiol; p-chlorobenzenethiol; p-toluenethiol; 2,4-di-chlorobenzenethiol; 4-chloro-o-toluenethiol; p-methoxybenzenethiol; 4-chloro-o-toluenethiol; p-benzenedithiol; pyridine-2-thiol; thiophene-2-thiol; 2-mercaptobenzothiazole; 2-mercaptothiazole; methanol; ethanol; 1-propanol; 2-methyl-1-propanol; 2-ethyl-1-hexanol; 1-dodecanol; ethylene glycol; glycerol; benzyl alcohol; cyclohexanol; 1,4-cyclohexanediol; phenol; o,m, or p-cresol; 2,4-xylenol; 2,5-xylenol; p-chlorophenol; m-bromophenol; p-hydroxyacetanilide; p-hydroxyacetophenone; p-hydroxybenzonitrile; 1-naphthol; 2-naphthol; 4-(methylthio)- phenol; and 1,4-cyclohexane dimethanol.

To prepare the product for application to the polyester substrates the product must be suitably dispersed. This may be done in any of several well-known methods, milling as in a ball-mill with dispersing agents such as lignin sulfonic acid materials, for instance. The resultant aqueous dispersion can be dried, as in a spray-dryer, or preserved and used as a paste. Standardization to any desired lower strength can be done with inert colorless diluents such as inorganic salts for powders, or water for pastes. Other materials such as preservatives, foam-control agents, and wetting agents may be added as desired.

Dispersed pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products of sulfonated naphthalene and formaldehyde, such as sodium dinaphthylmethane disulfonate, are conveniently used. The oil disperse paste may be cut or standardized to a standard strength with water. The final color content of the finished paste averages from 10–40 percent by weight (pure color) active dye base.

Disperse powders are prepared by wet milling color in the presence of a dispersant, such as those mentioned hereabove, in equipment such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to aid in wetting out the product when it is placed in the dye bath. Disperse powders are usually cut or standardized to 25–60 percent by weight color content (pure color).

The dye is preferably applied to the aromatic polyester fiber by thermofixation methods, such as the "Thermosol" process. This process involves padding the cloth with a dilute dye dispersion, followed by drying to remove water (e.g., by preheating with infrared heat) and curing by dry heat fixation using dried hot air or heated contact rolls. Curing or fixation temperatures of 350°–430°F are used for less than 2 minutes, usually for 30 to 90 seconds. Ordinarily, if the padded fabric is entirely polyester, curing is done at 400°–430°F. If the fabric contains cotton or viscose rayon, apart from synthetic fibers, there is little danger of damaging cellulosic portions, but if wool is present, the curing temperature must be kept below 357°F and the time must be reduced to about 30 seconds.

For durable press finishing of mixed polyester-cotton blends, after thermofixation the residual unfixed dye is removed from the fabric by scouring and the cleaned fabric is given a durable press cure at 300°–350°F. The new dyes of the invention show an excellent diffusion rate in the polyester at the dyeing temperature and a low diffusion rate at the preferred press curing temperature of 300°–350°F.

In order to evaluate the effectiveness of a particular dye for a given type of fiber, the dyed fiber is examined for substantivity of the color, light fastness of the color, and resistance of the color to sublimation. Specific tests for the evaluation of these important properties are described in the examples that follow.

My invention is further illustrated by the following examples:

EXAMPLE I

4,X-Dichlorochrysazin

Charged into a 1 liter 4-neck flask, equipped with stirrer, thermometer and reflux condenser, 96 g. — chrysazin (0.4 mole)
400 g. — nitrobenzene, and
250 g. — sulfuryl chloride.

The mixture was heated slowly; reflux began about 60°C. Heating was continued for 85°C and the temperature was maintained at 85°–90°C for 6 hours. The reaction mixture was agitated overnight. The mass was filtered and the product was washed first with 150 ml. — denatured alcohol.

It was then washed acid free with water and dried in an oven.

Yield: 99 g. Th. Yield: 123.6 g.(80%)

EXAMPLE II

1,4-Dianilino-X-chloro-8-hydroxyanthraquinone

Charged into a 500 ml. 4-neck flask equipped with stirrer, thermometer and short air condenser, 31 g. —4,X-dichlorochrysazin (0.1 mole)
150 g. — aniline, and
8 g. — boric acid.

The temperature was raised to 150°C and maintained at 150°–160°C for 20 hours. The reaction mixture was allowed to cool to 40°C and was diluted with 250 ml. — methanol.

The mixture was heated to reflux, then allowed to cool to room temperature overnight. The mass was filtered and the cake was sucked dry. It was then stirred with 150 g. — dimethyl formamide for 2 hours.

The mixture was filtered and the product was washed with hot water. The cake was dried. It weighed 31 g. (70% of the theoretical yield).

Standardization

A 7.5% color content paste was made.
Charged to a ball-mill;
27 g. — 100% color
33 g. — "Reax 85A" (sodium lignin sulphonate) and 300 g. water + 2 drops Surfanol 104 (solid ditertiary acetylenic glycol surfactant).

The mixture was milled until the dispersion test was satisfactory.

EXAMPLE III

A dilute dispersion of 120 g/l concentration of the dye paste of Example II was padded on to Type 54 Dacron polyester fabric. After evaporation of the water, which leaves small dyed particles on the surface of the fabric, the dye was fixed by heating for 60–90 seconds at 400°–430 F. This dry-heat fixation leaves some residual by mechanically adhering to the surface of the fabric. Unfixed dye was removed from the fabric by scouring.

Sample dyeings were tested for sublimation according to standard AATCC Color Fastness to Dry Heat (sublimation) Test No. 117-1967T, Page 123 of the 1970 Technical Manual of the American Association of Textile Chemists and Colorists. Dyed fabric was placed between a sandwich of undyed "Dacron" polyester fabric and heat was applied for 30 seconds. Sublimation tests were made at 350°F and 400°F on goods as described above. The dyeing was characterized by a deep bluish-green hue. Sublimation tests showed substantially no transfer of color, even at 400°F.

The dyeings were also tested for light fastness by subjecting them to carbon arc fading in accordance with AATCC. Color Fastness to Light, Carbon Arc Lamp, Continuous Light Test No. 16A-1964, as detailed on p.127, of the 1970 Technical Manual of the AATCC. The dyeings showed only a very slight break at 40 hours' exposure, indicating good fastness to light.

EXAMPLE IV

1,4-Di(p-toluidino)-X-chloro-8-hydroxyanthraquinone

Charged into a 500 mo. 4-neck flask equipped with stirrer, thermometer and short air condenser, 150 g. — p-toluidine.

It was stirred and melted at 50°C. Then there was added 39 g. — 4,X-dichlorochrysazin (0.125 mole), and
10 g. — boric acid.

The temperature was raised to 155°C and maintained at 155°–160°C for 19 hours.

The reaction mixture was allowed to cool to 100°C at which temperature it was diluted portionwise with 250 ml. — methanol.

The reaction mass was refluxed for 2 hours and was filtered hot. The cake was washed first with 150 ml. — methanol, then with hot water. The cake was dried in an oven at 80°C.

Yield: 43 g. Th. Yield: 58.5 g. (73.3%)

Standardization

A 7.5% color content paste was made.
Charged to a ball-mill
27g. — 100% color
33 g. — "Reax 85A" (sodium lignin sulphonate) and 300 g. — water + 2 drops "Surfanol 104" (solid d500itertiary acetylenic glycol surfactant).

The mixture was milled until the dispersion test was satisfactory. Dyeing on polyester made by the thermofix method were green in hue, somewhat yellower in shade than those found in Example III. Properties were comparable.

EXAMPLE V

1,4-Di-(p-anisidino)-X-chloro-8-hydroxyanthraquinone

Charged into a 500 ml 4-neck flask equipped with stirrer, thermometer and short air condenser 150 g. — p-anisidino It was stirred and melted at 60°C. Then there was added 31 g. — 4,X-dichlorochrysazin (0.1 mole), and
8 g. — boric acid.

The temperature was raised to 140°C and maintained at 140°–145°C for 15 hours.

The reaction mixture was allowed to cool to 100°C at which temperature it was diluted portionwise with 250 ml. — denatured alcohol.

The reaction mass was refluxed for 3 hours and was filtered hot. The cake was washed first with 150 ml. — denatured alcohol, then with hot water. The cake was dried in an oven.

Yield: 36 g. Th. Yield: 50 g. (72%)

Standardization

A 7.5% color content paste was made.
Charged to a ball-mill
30 g. — 100% color
36.3 — "Reax 85-A" and,
333.7 g. —water.

The mixture was milled until the dispersion test was satisfactory. When applied to polyester fabric by the thermofixation metohd, yellowish green hues of outstanding sublimation fastness and good light fastness were obtained.

EXAMPLE VI 1,4-Di-(2,4-xylidino)-X-chloro-8-hydroxy-anthraquinone

Charged into a 500 ml 4-neck flask equipped with stirrer, thermometer and short air condenser
120 g. — 2,6-Xylidine
31 g. — 4,X-dichlorochrysazin (0.1 mole), and
8 g. — boric acid, The temperature was raised to 150°C and maintained at 155°–155°C for 20 hours. The reaction mixture was allowed to cool to 100°C at which temperature it was diluted portionwise with 250 ml. — denatured alcohol.

The reaction mass was refluxed for 2 hours and was filtered hot. The cake was washed first with 150 ml. — denatured alcohol, then with hot water. The cake was dried in an oven.

Yield: 35 g. Th. Yield: 49.6 g. (70.5%)

Standardization

A 7.5% color content paste was made.
Charged to a ball-mill
30 g. — 100% color
36 g. — "Reax 85-A" (sodium lignin sulphonate) and 334 g. — water + 2 drops "Surfanol 104" (solid ditertiary acetylenic glycol surfactant). The mixture was milled until the dispersion test was satisfactory. When dyed on polyester, by thermofix methods, green hues of excellent durability were obtained.

EXAMPLE VII 1,4-Di-(m-chloroanilino)-X-chloro-8-hydroxyanthraquinone

Charged into a 500 ml. 4-neck flask equipped with stirrer, thermometer and short air condenser
31 g. — 4,X-dichlorochrysazin (0.1 mole)
120 g. — m-chloroaniline, and
13 g. — trimethyl borate.

The temperature was raised to 170°C and maintained at 170°–175°C for 20 hours.

The reaction mixture was allowed to cool to 100°C at which temperature it was diluted portionwise with 250 ml. — denatured alcohol.

The reaction mass was refluxed for 3 hours and was filtered hot. The cake was washed first with 150 ml. — denatured alcohol, then with hot water. The cake was dried in an oven.

Yield: 38 g. Th. Yield: 51 g. (74.5%)

Standardization

A 7.5% color content paste was made.
Charged to a ball-mill
30 g. — 100% color
36 g. — "Reax 85 A" (sodium lignin sulphonate) and 334 g. — water + 2 drops "Surfanol 104" (solid ditertiary acetylenic glycol surfactant).

The mixture was milled until the dispersion test was satisfactory. Polyester was dyed attractive green hues of excellent durability, especially to sublimation.

EXAMPLE VIII 1,4-Dianilino-X-(2-hydroxymercapto)-8-hydroxyanthraquinone

Charged into a 1 liter 4-neck flask equipped with stirrer, thermometer and reflux condenser
350 ml. — hot water, and
97.7 g. — (wet cake) of 1,4-dianilino-X-chloro-8-hydroxyanthraquinone = 44 g. dry content (0.1 mole).

The mixture was stirred for one-half hour. Then there was added
20 g. 50% caustic soda solution, and
15 g. — 2-mercapto ethanol.

The mixture was heated at reflux for 5 hours. The reaction mass was allowed to cool to room temperature. The it was neutralized to slight acidity with dilute hydrochloric acid. The mixture was filtered and washed acid free with water. The cake was dried in an oven.

Yield: 45 g. Th. Yield: 48.2 g(93%).

Standardization

A 10% color content paste was made.
Charged to a mill
40 g. — 100% color
50 g. — "Reax 85A" and
310 g. — water.

The mixture was milled until the dispersion test was satisfactory. Polyester colored with the produced material was a grayish-green of excellent properties, especially to sublimation.

EXAMPLE IX

4,X-dibromochrysazin charged into a 1 liter 4-neck flask, equipped with stirrer, thermometer and reflux condenser
96 g. — chrysazin (0.4 mole) and
400 g. — nitrobenzene.

The mixture was stirred and heated to 65°C. There was added at 65°–70°C during 2 hours
132 g. — bromine.

Temperature was raised to 100°C during 2 hours and maintained at 100°–105°C for 18 hours. The reaction mixture was cooled to room temperature. The mass was filtered and the product was washed first with 150 ml. — denatured alcohol.

It was then washed with hot water and dried in an oven.

Yield: 135 g. Th. Yield: 159.2 g(85%).

EXAMPLE X 1,4-Dianilino-X-bromo-8-hydroxyanthraquinone

When the 4,X-dichlorochrysazin in Example II was substituted with 50 g. — 4,X-dibromochrysazin, 36 g. — 1,4-dianilino-X-bromo-8-hydroxyanthraquinone were obtained.

A dispersion of the product when applied to polyester fabric by the thermofixation method gave deep bluish green hues of excellent sublimation fastness and good light fastness.

EXAMPLE XI 1,4-Di-(p-toluidino)-X-bromo-8-hydroxyanthraquinone

When the 4,X-dichlorochrysazin in Example IV was substituted with 50 g. — 4,X-dibromochrysazin, the product obtained when properly dispersed and applied on polyester fabrics by the therma-fixation methods give bluish green hues of outstanding sublimation and good light fastness.

What is claimed is:

1. A method of coloring aromatic polyester textile material in deep blue-green hue comprising:
   a. padding a polyester textile material with a dispersion of a dye of the formula:

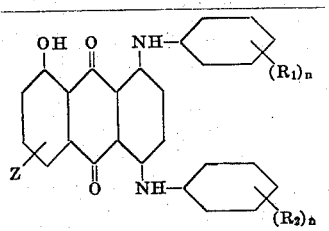

wherein Z is a non-peri chlorine or bromine, $R_1$ and $R_2$ are members selected from the group consisting of hydrogen, chlorine, lower alkyl and lower alkoxy and n is an integer having a value of 1–2, at an elevated temperature of at least 400°F,
   b. drying to remove water and
   c. dry heat curing the dried material at a temperature of 350°–430°F for a period of less than 2 minutes.

2. A method according to claim 1 in which curing is done in the presence of dry hot air.

3. A method according to claim 1 in which curing is done between heated contact rolls.

4. A method according to claim 1 in which the textile material is a polyester-cotton blend.

5. Aromatic polyester textile material dyed with a compound of the formula

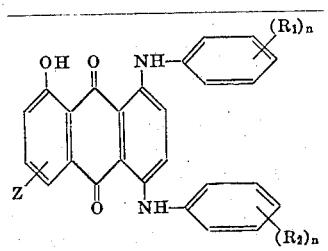

where Z is chlorine or bromine, $R_1$ and $R_2$ are members selected from the group consisting of hydrogen, chlorine, lower alkyl and lower alkoxy and $n$ is an integer having a value of 1–3; Z being located in a non-peri position of the anthraquinone nucleus.

6. Polyester textile material of claim 5 in which $R_1$ and $R_2$ are p-$CH_3$ and $n$ is 1.

7. Polyester textile material of claim 5 in which $R_1$ and $R_2$ are H and $n$ is 1.

8. Polyester textile material of claim 5, in which $R_1$ and $R_2$ are p-$OCG_3$ and $n$ is 1.

9. Polyester textile material of claim 5 in which $R_1$ and $R_2$ are $CH_3$ and $n$ is 2.

10. Polyester textile material of claim 5 in which $R_1$ and $R_2$ are m-Cl and $n$ is 1.

* * * * *